(12) United States Patent
Hemphill

(10) Patent No.: US 7,634,954 B2
(45) Date of Patent: Dec. 22, 2009

(54) DEVICE FOR CREATING AN ESPECIALLY LARGE TRANSMISSION RATIO FOR ACTUATING DRIVES OR ACTUATORS

(75) Inventor: Jeffrey Hemphill, Copley, OH (US)

(73) Assignee: Luk Lamellen und Kupplungsbau Beteiligungs KG, Buehl (DE)

(*) Notice: Subject to any disclaimer, the term of this patent is extended or adjusted under 35 U.S.C. 154(b) by 339 days.

(21) Appl. No.: 11/400,860

(22) Filed: Apr. 10, 2006

(65) Prior Publication Data
US 2006/0266142 A1    Nov. 30, 2006

Related U.S. Application Data

(60) Provisional application No. 60/672,109, filed on Apr. 15, 2005.

(51) Int. Cl.
*F16H 33/00* (2006.01)
(52) U.S. Cl. ..................................... 74/640
(58) Field of Classification Search ............ 74/640; 475/162, 169, 170, 176, 180
See application file for complete search history.

(56) References Cited

U.S. PATENT DOCUMENTS

| | | | | |
|---|---|---|---|---|
| 1,942,794 A | * | 1/1934 | Benson | 475/162 |
| 3,229,549 A | * | 1/1966 | Riedl et al. | 74/640 |
| 3,385,119 A | * | 5/1968 | Berger | 74/61 |
| 4,170,100 A | * | 10/1979 | Hood et al. | 56/340.1 |
| 4,223,568 A | * | 9/1980 | Brems | 475/11 |
| 4,297,920 A | | 11/1981 | Richter | |
| 4,594,915 A | | 6/1986 | Braren | |
| 4,619,156 A | | 10/1986 | Kiryu | |
| 4,697,477 A | * | 10/1987 | Barr | 475/154 |
| 4,840,090 A | | 6/1989 | Iwata | |
| 5,324,240 A | * | 6/1994 | Guttinger | 475/162 |
| 5,505,668 A | * | 4/1996 | Koriakov-Savoysky et al. | 475/180 |
| 6,012,347 A | * | 1/2000 | Hasegawa | 74/388 PS |
| 6,220,115 B1 | * | 4/2001 | Hirn et al. | 74/640 |
| 6,564,762 B2 | * | 5/2003 | Dow | 123/78 F |

FOREIGN PATENT DOCUMENTS

| | | |
|---|---|---|
| DE | 28 30 909 | 1/1980 |
| DE | 32 06 992 | 9/1983 |
| DE | 38 01 387 | 7/1988 |

* cited by examiner

*Primary Examiner*—David D. Le
(74) *Attorney, Agent, or Firm*—Simpson & Simpson, PLLC

(57) ABSTRACT

A device for creating a large transmission ratio for actuating drives the device comprising a first shaft supported rotatably about a first rotation axis, an eccentric supported by the first shaft, a transmission part, which is provided with a gear rim including a first gear tooth system, and a gear wheel, which is supported rotatably about a second rotation axis and which is provided with a second gear tooth system, wherein the eccentric is in driving connection with this transmission part, wherein the first gear tooth system of the gear rim engages in the second gear tooth system of the gear wheel and wherein additionally the second rotation axis is at a distance from the first rotation axis.

9 Claims, 2 Drawing Sheets

DEVICE FOR CREATING AN ESPECIALLY LARGE TRANSMISSION RATIO FOR ACTUATING DRIVES OR ACTUATORS

CROSS REFERENCE TO RELATED APPLICATIONS

This patent application claims the benefit under 35 U.S.C. §119(e) of U.S. Provisional Application No. 60/672,109, filed Apr. 15, 2005, which application is incorporated herein by reference.

FIELD OF THE INVENTION

The invention relates to a device for creating an especially large transmission ratio for actuating drives or actuators, a harmonic gear, an actuating device, a motor vehicle gear mechanism and also a motor vehicle steering device.

BACKGROUND OF THE INVENTION

In many actuating devices or actuators, it is necessary or desirable to provide a large transmission ratio between a drive mechanism and/or power source, such as for example, an electric motor and a driven component, such as for example, a release bearing or the like.

It is already known from prior art that several gear stages are to be provided in order to create large transmission ratios. This is possible, for example, by interconnecting several wheel sets in series—relative to the torque flow. An example for this is that a first shaft drives—over a first gear stage—a second shaft, which in turn drives—over a second gear stage—a third shaft, which in turn then drives—over a third gear stage—a fourth shaft if necessary etc. Depending on the targeted overall transmission ratio, a targeted large transmission ratio can be achieved using the number of the shafts and gear stages designed according to this principle and also using the individual transmission ratios of each of the wheel sets interconnected in series.

Furthermore, it is known from prior art that several planetary gears can be interconnected with a view to achieving a large total transmission ratio.

The aforementioned designs thus use several individual transmission ratio stages for creating the large overall transmission ratio.

In addition, designs are also known from prior art in which a large overall transmission ratio can be achieved by means of a single transmission ratio stage.

Devices and/or gears of this type are known, for example, as harmonic gears and/or harmonic speed changers or as cycloid gears.

Examples of harmonic gears are disclosed in U.S. Pat. Nos. 4,619,156 or 4,840,090 and corresponding German Patent No. DE 38 01 387 A1. Examples of cycloid gears are disclosed in U.S. Pat. No. 4,297,920 and corresponding German Patent No. DE 28 30 909 and also in U.S. Pat. No. 4,594,915 and corresponding German Patent No. DE 32 06 992.

The hitherto known harmonic gears and/or harmonic speed changers substantially comprise three parts, namely a wave generator, a flexible gear shaft and/or a hollow flexible part and also a gear ring.

The flexible gear shaft usually comprises a rigid shaft and/or collar, which is connected to a cup-like, thin-walled steel part, which supports on its external casing a circumferentially arranged gear tooth system embodied mostly as a spline. The wave generator is thereby usually a device, which comprises a bearing and also a wave generator plug. The external surface of this wave generator plug usually has an ellipsoidal shape. A specially designed ball-bearing is arranged therearound, which is usually tight-fitted in such a way that it essentially assumes the same ellipsoidal shape as that of the wave generator plug. The wave generator is thereby mostly used as the input part and is usually connected to a servomotor.

For the purpose of installation, the wave generator is inserted into the flexible shaft in such a way that its ball-bearing essentially assumes the same axial position as the gear tooth system of the flexible shaft. The thin wall of the flexible shaft and/or its thin radial external wall of its cup-like contour essentially assume—in the region of one edge—the same ellipsoidal shape of the bearing. Due to this the teeth of the external surface of the flexible shaft are also arranged corresponding to this ellipsoidal shape, so that the flexible shaft has an ellipsoidal pitch circle diameter on its external surface. The flexible shaft is usually used as an output part of the harmonic gear. When in operation, the flexible shaft gets deformed, wherein said deformation is not a sign of wear.

The gear ring is usually a rigid ring with a gear tooth system on its inside. The gear ring is usually fixed in a housing so that it cannot rotate. The gear ring is positioned in such a way that its teeth engage in those of the flexible shaft. The engagement thereby takes place in the region of and/or along the long principle axis of the ellipsoidal shape, so that the ellipsoidally arranged gear tooth system is located essentially concentric to the circular gear tooth system of the gear ring and the ellipsoidal gear tooth system engages with the gear ring tooth system in two opposite regions.

The flexible shaft thereby has two teeth less than the gear tooth system of the gear ring. The transmission ratio is thereby determined by the ratio of the number of teeth of the flexible shaft to the difference in the number of teeth of the flexible shaft and the number of the teeth of the gear ring. Thus, if, for example, the gear tooth system of the flexible shaft comprises 200 teeth and the gear tooth system of the gear ring has 202 teeth, the transmission ratio results of $200/(200-202)=-100$, wherein the negative sign indicates that the input side and the output side rotate opposite to one another.

Cycloid gears usually comprise a fast rotating input shaft having an eccentrically arranged radial cam and also a rolling bearing device. Furthermore, they usually comprise a cycloid disk and a slowly rotating output shaft.

Both the hitherto known cycloid gears as well as the harmonic gears and/or harmonic speed changers of the type known so far are designed according to the so-called "on-axis" principle. Thus especially the drive and/or the driving side and the output and/or the output side are arranged on and/or relative to the same axis, thus concentrically, in particular. In order to achieve an "off-axis drive" and/or "off-axis control" in these designs of the known type, one or more transmission ratio stages in addition to the cycloid gear and/or harmonic gear are added, wherein said transmission ratio stages cannot be assigned to the actual cycloid gear and/or the harmonic gear.

The requirement of an "off-axis design" in such embodiments usually leads to the motor or a corresponding drive device being arranged at a distance and is connected using a corresponding connection to the driving and/or driven element, such as for example, a hydraulic connection in hydrostatic systems or a rope and/or belt or a lever or other elements in mechanical systems.

SUMMARY OF THE INVENTION

The object of the invention is to create a design, which can be arranged between a drive device such as for example, a motor and a driven element, especially a rotatively driven element, such as for example, a rotatively driven shaft for creating an especially large transmission ratio and is thereby designed according to the "off-axis" principle.

According to the invention, a device for creating an especially large transmission ratio for actuating drives or actuators is suggested, said device comprising a first shaft which is supported rotatably about a first rotation axis and which supports an eccentric. The eccentric is thereby fixedly connected to this first shaft. Furthermore, the device comprises a transmission part, which is provided with a gear rim and/or a gear ring. This gear rim and/or gear ring comprises a first gear tooth system and/or forms a first gear tooth system. The transmission part can be, for example, a lever or a crank and/or a lever provided with a gear rim or a crank provided with a gear rim. The gear rim, for example, can thereby be arranged with its end side on one end of this transmission part, thus especially on one end of this lever and/or of this crank.

The gear rim and/or the gear ring can be embodied as, for example, a ring, which is provided with an internal gear tooth system. In an advantageous design form, the transmission part is embodied in a single piece and it embodies the gear rim and/or the gear ring. For example, the transmission part can comprise an elongated part, especially a steel part, on the end of which the gear rim and/or the gear ring is molded.

The device for creating an especially large transmission ratio for actuating drives or actuators comprises additionally a gear wheel, which is supported rotatably about a second rotation axis, and which is provided with a second gear tooth system and/or which embodies a second gear tooth system.

The eccentric is in driving connection with the transmission part and/or the crank and/or the lever. The driving connection is advantageously of such type that the transmission part is held on the eccentric. It is particularly advantageous if the transmission part, thus the lever and/or the crank is articulated on the eccentric. This is possible, for example, by creating by means of a joint in articulated connection acting directly between the eccentric and the transmission part. For example, for this purpose, the transmission part can be articulated by means of a bolt or a pin or the like on the eccentric. The bolt and/or pin can thereby be fixedly molded on one of the two parts, i.e., the eccentric and/or the transmission part and can stretch into a corresponding opening or loop or recess such as a borehole of the other part for the articulated connection. It is also possible to design the bolt and/or the pin or the like such that they can each stretch into the recess, such as the borehole or the gap of both these parts, i.e. the eccentric and the transmission part for creating the articulated connection.

The point of articulation is thereby arranged eccentrically to the rotation axis of the first shaft, which supports the eccentric.

For example, the eccentric can also be formed by a circular disk, which is fixedly arranged on the first shaft and which is connected to the first shaft eccentrically relative to the first rotation axis thereof. On the transmission part(s) and/or as a component thereof, a ring and/or the gear ring can be provided, whose internal diameter essentially corresponds to the external diameter of the disk forming the eccentric. The ring can thereby receive said disk from outside such that the disk is rotatable relative to the ring and the transmission part is driven using this engagement in an eccentric movement of the eccentric.

The first gear tooth system of the gear rim engages in the second gear tooth system of the gear wheel. One of these two gear tooth systems, i.e., either the first gear tooth system of the gear rim or the second gear tooth system of the gear wheel is designed as the external gear tooth system and the respective other of these two gear tooth systems is designed as the internal gear tooth system. Furthermore, the device for creating an especially large transmission ratio for actuating drives or actuators is designed in such a way that the second rotation axis is at a distance from the first rotation axis. Thus the first shaft and the gear wheel, in which the gear rim of the transmission part engages, are arranged non-concentrically with respect to one another, and/or at a distance from one another transverse to their respective rotation axes so that the two rotation axes do not coincide. As mentioned before, in an advantageous design form the transmission part and/or the lever and/or the crank is articulated on the eccentric. This is possible, for example, by positioning the point of articulation eccentrically relative to the first rotation axis so that the transmission part essentially follows the movement of the eccentric.

In a particularly preferred design form, the device for creating an especially large transmission ratio for actuating drives or actuators comprises a guiding device and/or a diversion device for the transmission part and/or the crank and/or the lever. The guiding device and/or the diversion device can, for example, be arranged in such a way that a movement and/or load fed by the eccentric into the transmission part is reflected by means of said guiding device and/or diversion device to a region of the transmission part, which is arranged on the point of articulation and/or coupling point with the side of the guiding and/or diversion device, said side being turned away from the eccentric.

The gear rim and/or the gear ring can also be arranged on a first, especially axial end of the transmission part, wherein this transmission part is coupled to the eccentric at a point that is turned away from this first end. The transmission part can be coupled to the eccentric, for example, in a manner that was mentioned previously or is mentioned in the following description. Between this point of the transmission part at which the transmission part is coupled to the eccentric and the gear rim and/or the gear ring, it is possible to provide a diversion device and/or a guiding device for the eccentric and/or acting on the transmission part. In particular, between said point at which the transmission part is coupled to the eccentric and the gear rim, the transmission part can be provided with a groove, especially a guide groove, in which a guide pin or bolt or the like engages.

The guide groove can also be designed, for example as a gap. In a preferred embodiment the groove is embodied as an oblong hole and/or slot. It stretches, for example, in a straight line and its width in its expansion located transverse to the longitudinal direction corresponds essentially to and/or is marginally larger than the external diameter of the engaging bolt and/or pin so that the bolt can move in the groove.

In a particularly preferred design form, the groove with the bolt engaging therein and/or the diversion device and/or the guiding device for the transmission part interact with the eccentric and/or the coupling between the eccentric and the transmission part, in such a manner that the movement path of the gear rim is defined distinctly in case of the rotating first shaft. In a preferred design form, the groove provided in the transmission part runs essentially radially relative to the gear rim and/or the gear ring. Furthermore, it is expedient if this groove runs essentially radially to an articulation axis and/or rotation axis, which are assigned to an articulated connection between the eccentric and the transmission part. In an especially preferred design form, the groove runs towards the connection lines between said articulation axes of the joint formed between the transmission part and the eccentric and the center of the gear rim of the transmission part. Furthermore, it is advantageous if the bolt and/or pin engaging in the groove is fixedly arranged and can move in the groove. For example, it can be supported on a housing or the like. However, this bolt can also be supported rotatably about its longitudinal axis in order to reduce the friction in interaction with the groove.

Instead of arranging the groove in the transmission part and a bolt engaging therein which is supported, especially fixedly, in a housing, it is also possible to provide a transmission part which comprises a bolt, which engages in a groove and/or a corresponding guide mechanism, which is not a component of the transmission part, and thus is arranged, for example, on the housing. In a preferred embodiment, the first gear tooth system of the gear rim and/or the gear ring is embodied as an internal gear tooth system and the second gear tooth system of the gear wheel is designed as the external gear tooth system. In an especially expedient design form, the gear rim and/or the gear ring and/or the first gear tooth system, on the one hand and the gear wheel and/or the second gear tooth system of the gear wheel on the other hand have different pitch circle diameters and/or different numbers of teeth. It is possible that the pitch circle diameter and/or the number of teeth of the first gear tooth system of the gear rim and/or the gear ring is larger than the pitch circle diameter of the second gear tooth system of the gear rim. The part, particularly the gear rim and/or the gear ring of these two parts, i.e., gear rim and gear ring, said part being provided with an internal gear tooth system, has a larger pitch circle diameter than the part, i.e., the gear wheel, of these two parts, said part being provided with an external gear tooth system.

The gear tooth system of the gear rim and/or gear ring and the gear tooth system of the gear wheel are each arranged in a circular form and thus are closed circumferentially. The gear tooth system of the gear rim and/or gear ring and that of the gear wheel can, for example, be splines, in each case.

In an expedient design form, the gear tooth system of the gear rim and/or gear ring has a larger number of teeth than the gear tooth system of the gear wheel, which engages in this gear rim and/or gear ring. For example, the gear tooth system of the gear rim and/or the gear ring can have two more teeth than the gear tooth system of the gear wheel. It is also possible, for example, that the difference in said numbers of teeth is equal to one or is greater—especially distinctly greater than two, wherein the number of teeth of the first gear tooth system of the gear ring and/or gear rim is designed to be greater than that of the second gear tooth system of the gear wheel.

In a preferred design form, the eccentric, transmission part and diversion and/or guiding device for the transmission part interact in such a manner that the gear rim and/or gear ring is driven—especially during the operation along a cycloid path around the driven gear wheel. In an especially preferred design form, the gear rim and/or the gear ring—especially during the operation—is constantly or permanently in contact with the driven gear wheel and/or engages with its first gear tooth system in the second gear tooth system of the driven gear wheel, wherein the contact point and/or the contact region rotates around the driven gear wheel once in each case for every rotation of the eccentric. In a preferred embodiment, the first rotation axis of the first shaft is located parallel to the second rotation axis of the rotatably supported gear wheel. The rotatably supported gear wheel, thus especially the driven gear wheel, can be supported by a second shaft. The first shaft can be a drive shaft and the second shaft can be an output shaft.

In an especially preferred design form, the gear rim and/or the gear ring and the gear wheel engaging with this gear rim and/or gear ring are each embodied rigidly either completely and/or in the region of their teeth.

In a preferred embodiment, an electric motor is provided, which is in driving connection with the first shaft. It is possible, for example, to arrange the output shaft of the electric motor concentrically relative to the first shaft. Furthermore, there can be a transmission ratio between the output shaft of the electric motor and the first shaft.

Furthermore, according to the invention, a harmonic gear system is suggested, said harmonic gear system comprising an input shaft which is supported rotatably about a first rotation axis and an output shaft which is supported rotatably about a second rotation axis and two parts, which are arranged between these two shafts and which are each provided with a circumferentially closed gear tooth system, wherein the gear tooth system of one of these parts is an external gear tooth system and wherein the gear tooth system of the other of these parts is an internal gear tooth system and wherein this internal gear tooth system engages in this external gear tooth system and wherein additionally one of these parts is supported rotatably about a rotation axis and wherein the other of these parts can rotate with its gear tooth system transverse to this rotation axis and wherein the input shaft is arranged at a distance from the output shaft. In a preferred embodiment, between this input shaft and this output shaft no additional shaft is arranged in the force flow and/or torque flow between the input shaft and the output shaft. One of these parts, which is supported rotatably about a rotation axis can, for example, be a gear wheel of such type as is explained in connection with the inventive device for creating an especially large transmission ratio for actuating drives or actuators and the other of these parts can, for example, be a transmission part of such type as is explained in connection with the inventive device for creating an especially large transmission ratio for actuating drives or actuators.

In a preferred design form, this harmonic gear system is embodied according to an inventive device for creating an especially large transmission ratio for actuating drives or actuators.

It is also possible that the inventive device for creating an especially large transmission ratio for actuating drives or actuators is a harmonic gear system.

Furthermore, according to the invention, especially an actuating device, such as, for example, an actuating drive or an actuator, is suggested, said actuating device comprising an inventive device for creating an especially large transmission ratio or an inventive harmonic gear system.

Furthermore, according to the invention, especially a motor vehicle gear mechanism for being arranged with a motor vehicle drive train is suggested. The motor vehicle gear mechanism is thereby supposed to be arranged especially between an internal combustion engine and a motor vehicle driving axle supporting one or two drive wheels of the motor vehicle.

The motor vehicle gear mechanism comprises several gear wheel sets for forming transmission ratio stages. These transmission ratio stages can be selectively switched into the torque flow of the drive train, in order to thus change the transmission ratio between the internal combustion engine and the drive wheel and/or drive wheels, wherein said transmission ratio cannot be mistaken for a transmission ratio of the actuating device. The motor vehicle gear mechanism comprises an actuating device, particularly an actuator, and also an actuator having exactly one or two or more electric motors. The actuating device is thus an actuating device according to the invention.

Furthermore, a motor vehicle steering device for steering a motor vehicle is also suggested. This motor vehicle steering device comprises an actuating device, which is embodied in the inventive manner.

BRIEF DESCRIPTION OF THE DRAWINGS

Exemplary embodiments of the invention are explained more in detail in the following description on the basis of the drawing of which.

DETAILED DESCRIPTION OF THE INVENTION

Figure 1:
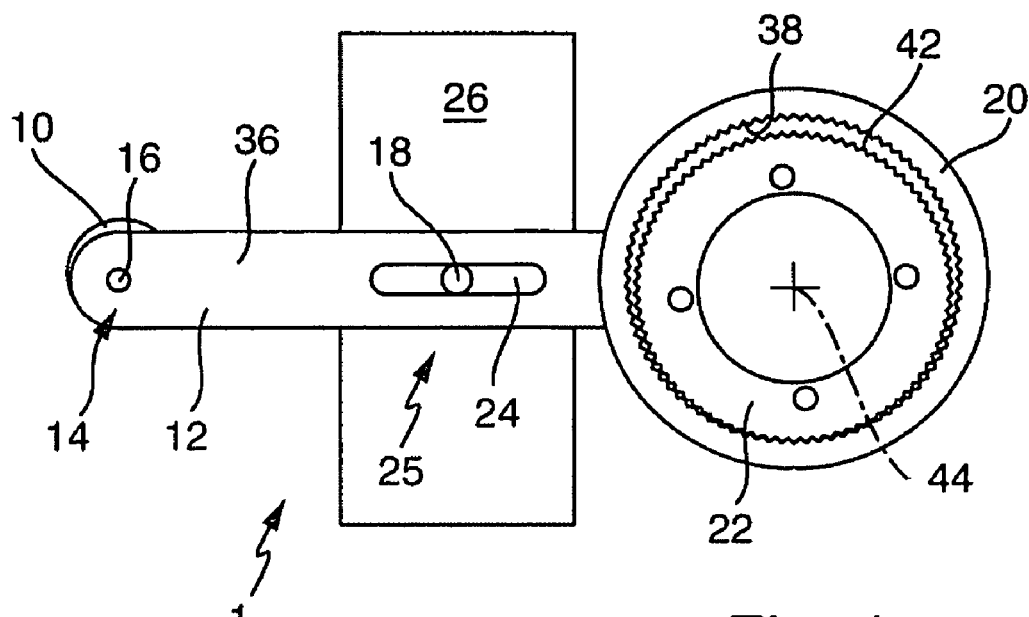
FIG. 1 illustrates the first schematic view of an exemplary inventive device for creating a large transmission ratio for actuating drives or actuators.
Figure 2:
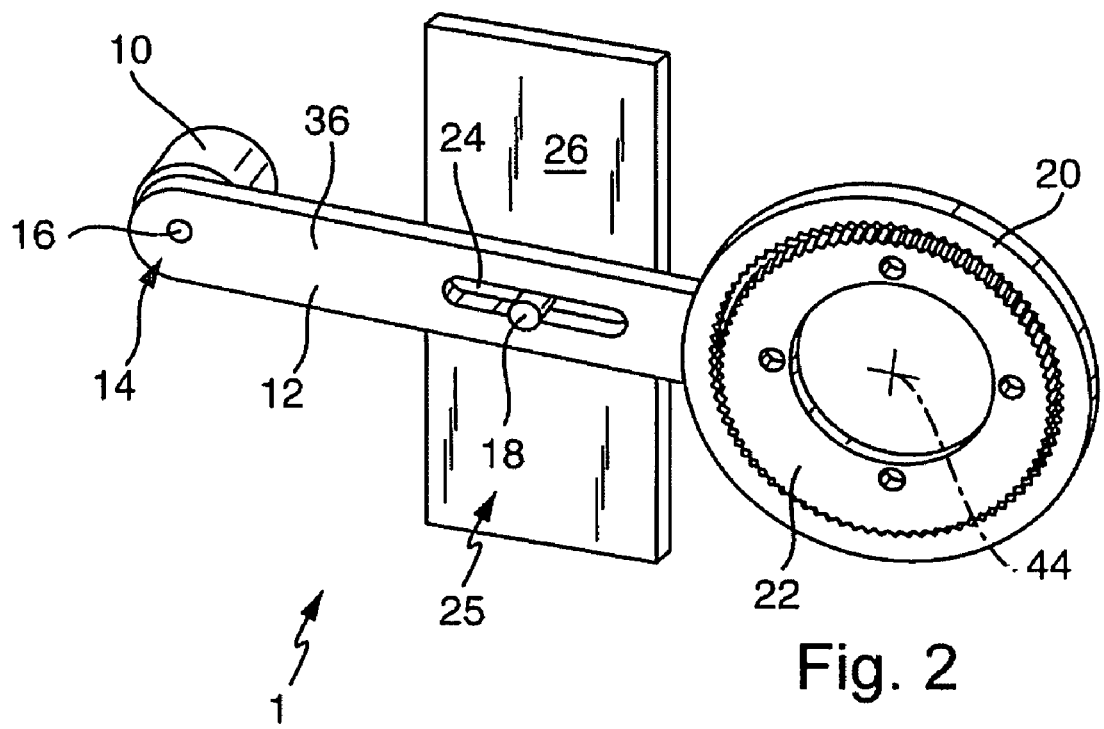
FIG. 2 illustrates the second view of the design shown in FIG. 1.

The inventive device for creating a large transmission ratio for actuating drives or actuators illustrated in FIGS. 1 and 2 comprises an eccentric 10, which is directly driven by an electric motor or a differently designed drive source and/or drive device. The eccentric 10 drives a transmission part, and/or a crank 12. This drive is such that the eccentric 10 drives the crank and/or the transmission part 12 (referred to as crank 12 in the following for the purpose of simplification) corresponding to the off-set of the and/or in the eccentric. The crank is articulated on the eccentric for which purpose a corresponding articulated connection 14 is provided, which is created here by means of a bolt 16. The position in which the crank 12 is articulated on the eccentric 10 is relative to the rotation axis of a shaft and/or of a rotatively driving part on which the eccentric 10 is fixedly arranged eccentrically so that the radial distance of the point of articulation 14 from said rotation axis determines the drive movement of the crank 12. This eccentric movement and/or crank movement is reflected by means of a fixedly arranged guide pin and/or bolt 18 on the other end of the crank 12. As can be seen in FIG. 1, the point of articulation 14 is arranged at one end of the eccentric 10, while a gear rim and/or gear ring 20 is embodied and/or provided on the other end of the eccentric 10.

According to FIG. 1, the crank 12 forms a gear ring profile 20, which is provided on a driving end of the crank 12 and especially on an end driving the driven gear wheel 22. This gear ring 20 and/or this gear ring profile 20 is especially designed to be a driving ring. This gear ring 20 and/or tooth profile engages in the teeth of a gear wheel 22. The gear wheel 22 is driven by the tooth profile and/or the gear rim and/or the gear ring 20.

The pitch circle diameter of the gear ring 20 is larger than that of the driven gear wheel 22.

The measure by which the pitch circle diameter of the gear ring 20 and/or the gear rim 20 is larger than that of the gear wheel 22 depends on and/or corresponds to this eccentricity.

The crank 12 comprises a groove 24 in which a fixedly arranged pin and/or bolt 18 engages. The fixedly arranged pin and/or bolt 18 can, for example, be provided on a housing. It can also be arranged rotatably relative to its longitudinal axis, for example, to reduce the friction. The groove 24 acts in interaction with the bolt 18 as the guiding device and/or the diversion device 25 for the crank 12.

The gear ring and/or the gear rim 20 comprises an internal gear tooth system and the gear wheel 22 is provided with an external gear tooth system.

The gear rim and/or gear ring 20 is driven on and/or corresponding to a cycloid path around the driven gear wheel 22. The gear ring 20 is always in contact with the driven wheel 22 and the point of contact and/or region of contact and/or the point of engagement of the gear tooth system of the gear ring 20 in the gear tooth system of the gear wheel 22 rotates around the driven gear wheel 22 once for each rotation of the eccentric 10 and/or the shaft supporting this eccentric 10. The eccentric then moves the driven gear wheel 22 due to and/or corresponding to and/or depending on the difference between the number of teeth of the gear ring 20 and of the driven gear wheel 22.

FIG. 2 illustrates a second view of the design form shown in FIG. 1. The component 26 illustrated as a type of plate is supposed to be a fixedly arranged component, for example, a housing. It can be clearly seen in FIG. 2 that the bolt and/or pin 18 is fixedly arranged on this component 26. Furthermore, it can also be clearly seen in FIG. 2 that the groove 24 is provided as a gap and/or as an elongated gap in the crank 12.

As shown by the embodiments, at least improved configurations of the invention can offer considerable advantages. Thus it is possible, for example, to create very large transmission ratios. The contact pressures and/or the surface pressures can be low, in comparison with conventional transmission systems and/or gear tooth systems since a very large number of teeth are in contact on the gear ring and the eccentric has a surface-type rather than line-type of contact.

Furthermore, the embodiment illustrates that the axial height of a device according to the invention can be designed to be very small.

Furthermore, the embodiment illustrates that it is quite possible to use a sheet metal crank due to the low teeth contact pressures.

Furthermore, an electric motor can be easily positioned according to the "off-axis" principle on an arbitrary radius and at an arbitrary angle relative to the other gear shafts.

Using the invention it is also possible to create and/or enable a design for creating a large transmission ratio for actuating drives or actuators, said design being based on the "off-axis" principle, in which additional transmission ratio stages or the like are necessary, though not mandatory, as in case of hitherto known cycloid transmission systems or harmonic gears.

In case of hitherto known cycloid gears or harmonic gears, the drive and/or the gear system for creating a large transmission ratio is "on-axis" with and/or relative to the driven element, due to which it is frequently difficult to accommodate it in an actuator. However, it is frequently necessary to position the driving part and/or input part "off-axis" relative to the driven part and/or the output part, this positioning being dependent on installation space requirements in the gear system, such as a motor vehicle gear system or the like.

For example, examples of improved configurations of the invention especially enable a large transmission ratio to be achieved by means of a single stage "off-axis design" so that several stages need not be switched—especially mandatorily—in series for creating the large transmission ratio.

It should be noted here that the connection of the eccentric to the gear ring could also be modified so as to provide two or more crank elements. Exactly one crank element is provided in the embodiment according to FIG. 1 and FIG. 2.

As shown by the embodiment, the drive and/or a drive shaft can be easily arranged according to the "off-axis" principle (axially parallel) relative to the driven element. This can be advantageous, for example, under certain installation space conditions. Known cycloid gear systems and/or harmonic gear systems that are usually designed according to the "on-axis" principle (concentrically) require larger installation space in the radial direction. It is therefore possible to suggest a satisfactory solution using the axially parallel arrangement in a small radial installation space.

Figure 3:
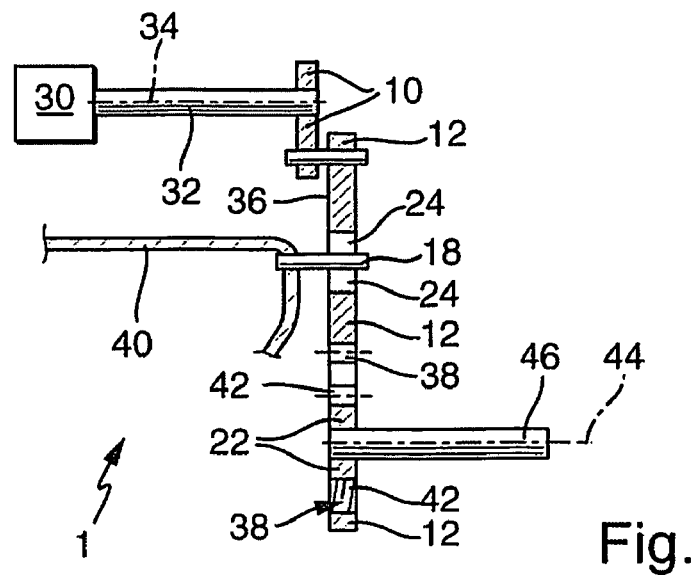
FIG. 3 illustrates a schematic view of another exemplary inventive device for creating a large transmission ratio for actuating drives or actuators.

FIG. 3 schematically illustrates another exemplary embodiment of the invention.

The device illustrated in FIG. 3 for creating a large transmission ratio for actuating drives or actuators comprises an electric motor 30, which rotatively drives a first shaft 32 about a first rotation axis 34. The first shaft 32 can be, for example, the motor shaft of the electric motor 30 or a shaft coupled thereto.

An eccentric 10 is arranged non-rotatably—and if necessary in an axially fixed manner on the first shaft 32. On this eccentric 10, a transmission part 12, which is especially a crank or a lever, is articulated by means of an articulated connection 14. For this purpose a bolt 16 is provided here, which stretches on a location that is eccentric relative to the first rotation axis 34 into the eccentric 10 and which stretches into the transmission part 12. It is also possible, for example, that the bolt 16 stretches only into an opening or a gap of one of these two parts 10, 12 and is fixedly arranged on the other of these two parts. Other designs creating a connection between the eccentric 10 and the transmission part 12 can also be provided, said designs enabling a relative torsion about the articulation.

The transmission part 12, which is preferably embodied in a single piece, as also in the design according to FIGS. 1 and 2, comprises an elongated section 36 on whose one end the articulated connection 14 with the eccentric 10 is provided and on whose other end a gear rim and/or gear ring 20 comprising a first gear tooth system 38, here internal gear tooth system, is provided, said gear rim and/or gear ring being the component of the transmission part 12.

Between this articulated connection 14 and/or the point of articulation of the transmission part 12 on the eccentric 10 and the gear ring 20, a diversion device and/or a guiding device 25 acts on the transmission part 12, said diversion device and/or a guiding device bring formed here by means of a groove 24, which is provided in the transmission part 12, and which is designed, for example, as an elongated gap and a guide pin and/or bolt 18, which engages in this groove 24. The guide pin and/or bolt 18 is moveably received inside the groove 24 and is fixedly mounted—for example on a housing 40 and/or a part 26—or mounted fixedly such that it can rotate about its axis or mounted fixedly transverse thereto.

Furthermore, the device 1 comprises a gear wheel 22, whose second gear tooth system 42 is designed as the external gear tooth system.

The first gear tooth system 38 of the transmission part 12 and the second gear tooth system 42 of the driven gear wheel 22 each stretch along a circular path. The pitch circle diameter and/or the number of teeth of the first gear tooth system 38 of the transmission part 12 is larger than the pitch circle diameter and/or the number of teeth of the second gear tooth system 42 of the driven gear wheel 22.

The first gear tooth system 38 of the transmission part 12 engages in the second gear tooth system 42 of the driven gear wheel 22. The second gear wheel 22 is supported rotatably about a second rotation axis 44, which is located at the center of this second gear wheel. Here, this takes place in such a way that the second gear wheel 22 is supported non-rotatably and, if necessary in an axially fixed manner—on a second shaft 46. The first shaft 32 is the input shaft, in particular and the second shaft 46 is the output shaft, in particular.

The first rotation axis 34 is located at a distance from and parallel to the second rotation axis 44.

In all other respects, the embodiment illustrated in FIG. 3 can be designed in accordance with the explanation based on FIGS. 1 and 2. Like and/or corresponding parts are provided with like reference numerals in the FIG. 1 to 3.

Figure 4:
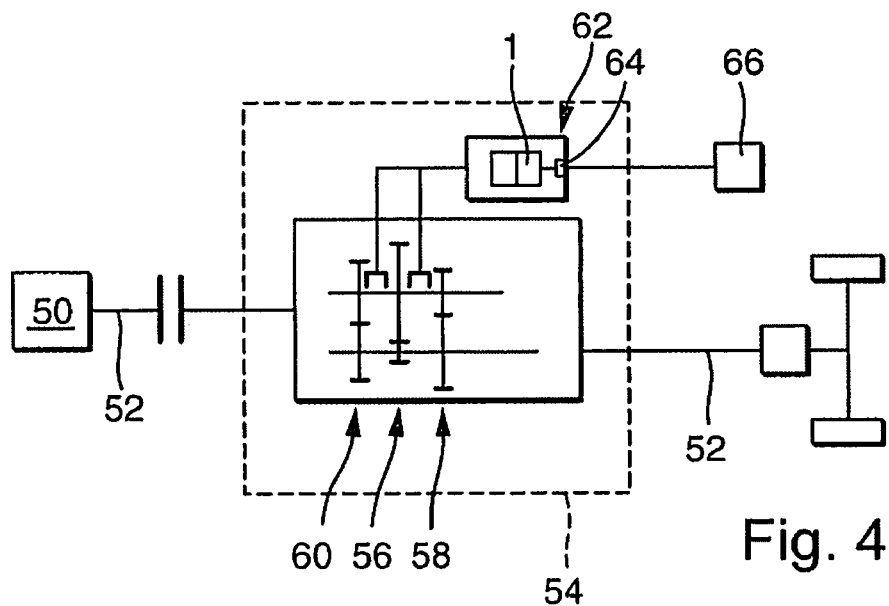
FIG. 4 illustrates a schematic view of a motor vehicle drive train having an exemplary inventive motor vehicle gear mechanism; and, FIG. 5 illustrates a schematic view of a motor vehicle having an exemplary inventive motor vehicle steering device.

FIG. 4 schematically illustrates another exemplary inventive embodiment. Here a motor vehicle gear mechanism 54 is schematically illustrated, wherein said gear mechanism is provided in a motor vehicle drive train 52 which can be driven by an internal combustion engine 50. Said gear mechanism comprises several gear wheel sets 56, 58, 60 which can be selectively switched into the torque flow of the drive train 52 and which are provided for creating gears. Furthermore, the motor vehicle gear mechanism 54 contains an actuator 62 for actuating and/or for engaging and disengaging gears.

The gear actuator 62 comprises an inventive device 1 for creating a large transmission ratio for actuating drives or actuators, said device being designed in accordance with the explanation based on FIGS. 1 and 2 and/or FIG. 3. The component of this gear actuator 62 is an electric motor 64, which can be controlled by an electronic control unit 66.

Figure 5:
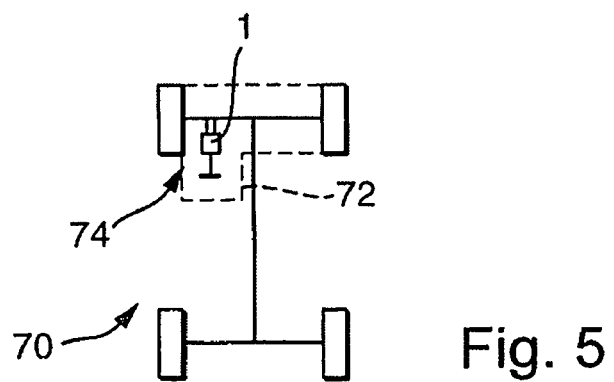

FIG. 5 schematically illustrates another exemplary design according to the invention. Here a motor vehicle 70 having an inventive motor vehicle steering device 72 for steering a motor vehicle 70 is illustrated. The motor vehicle steering device 72 comprises an actuating device 74, which is provided with an inventive device 1 for creating a large transmission ratio for actuating drives and which is designed in accordance with the explanation based on FIGS. 1 and 2 or based on FIG. 3 with the exception of the electric motor shown there.

LIST OF REFERENCE NUMERALS

1 Device for creating a large transmission ratio for actuating drives or actuators
10 Eccentric
12 Transmission part, particularly a crank and/or lever
14 Articulated connection between 10 and 12
16 Bolt of 14
18 Pin and/or bolt of 25
20 Gear rim and/or gear ring
22 (Driven) gear wheel
24 Groove in crank
25 Guiding device and/or diversion device 12
26 Component, particularly housing
30 Electric motor
32 First shaft
34 First rotation axis
36 Elongated section of 12
38 First gear tooth system of 12
40 Housing
42 Second gear tooth system of 22
44 Second rotation axis 46 Second shaft
50 Internal combustion engine
52 Motor vehicle drive train
54 Motor vehicle gear mechanism
56 Gear wheel set
58 Gear wheel set
60 Gear wheel set
62 Actuator
64 Electric motor
66 Electronic control unit
70 Motor vehicle
72 Motor vehicle steering device
74 Actuating device

What I claim is:

1. A device for creating an especially large transmission ratio for actuating drives or actuators, said device comprising:
   a first shaft (32), which is supported rotatably about a first rotation axis;
   exactly one eccentric (10), which is supported by the first shaft (32);
   a transmission part (12), which is provided with a gear rim (20) comprising a first gear tooth system (38), a gear wheel (22), which is supported rotatably about a second rotation axis (44) and which is provided with a second gear tooth system (42);
   wherein the eccentric (10) is in driving connection with this transmission part (12) and wherein the transmission part (12) is articulated on the eccentric (10);
   wherein the first gear tooth system (38) of the gear rim (20) engages in the second gear tooth system (42) of the gear wheel (22), and wherein either the first gear tooth system comprises a first external gear tooth system and the second gear tooth system comprises a first internal gear tooth system, or wherein the first gear tooth system comprises a second internal gear tooth system and the second gear tooth system comprises a second external gear tooth system; and,
   wherein additionally the second rotation axis (44) is at a distance from the first rotation axis (34).

2. The device according to claim 1 wherein the transmission part (12) comprises a lever or a crank on which the gear rim (20) is arranged, and wherein the crank is arranged transversely between the first axis of rotation (34) and the second axis of rotation (44) for connecting the first shaft (32) to the gear rim (20).

3. The device according to claim 1 wherein a guiding device (25) is provided for the transmission part (12).

4. The device according to claim 1 wherein the first gear tooth system (38) of the gear rim (20) and the second gear tooth system (42) of the gear wheel (22) have different pitch circle diameters, wherein the pitch circle diameter of the first gear tooth system (38) of the gear rim (20) is larger than the pitch circle diameter of the second gear tooth system (42) of the gear wheel (22).

5. The device according to claim 1 wherein the first gear tooth system (38) of the gear rim (20) is designed as the internal gear tooth system and the second gear tooth system (42) of the gear wheel (22) is designed as the external gear tooth system.

6. The device according to claim 1 wherein the first rotation axis (34) of the first shaft (32) is located parallel to the second rotation axis (44) of the rotatably supported gear wheel (22).

7. The device according to claim 1 wherein the transmission part (12) comprises a groove (24), in which a guide pin (18) engages, wherein this groove (24) and this guide pin (18) interact to form a guiding device (25).

8. The device according to claim 7 wherein the guiding device (25) is arranged at a position along the transmission part (12) located between the eccentric (10) and the gear rim (20) of the transmission part (12).

9. The device according to claim 7 wherein a movement path of the gear rim (20) of the transmission part (12) is distinctly determined by an interaction of the transmission part (12) with the eccentric (10) and also with the guiding device (25), wherein the movement path is a cycloid path.

* * * * *